United States Patent
Lash et al.

(10) Patent No.: US 6,363,450 B1
(45) Date of Patent: Mar. 26, 2002

(54) MEMORY RISER CARD FOR A COMPUTER SYSTEM

(75) Inventors: Steven J. Lash, Leander; Stephanus Saputro, Round Rock, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/270,990

(22) Filed: Mar. 17, 1999

(51) Int. Cl.[7] .................. G06F 13/00; G06F 1/26; H05K 1/00; H01R 12/00
(52) U.S. Cl. .................. 710/301; 713/300; 361/748; 439/59; 439/65
(58) Field of Search .................. 710/300–302; 361/748, 760–764, 767–771, 780–783; 439/55, 59–62, 65–75; 713/300

(56) References Cited

U.S. PATENT DOCUMENTS

| | | | | |
|---|---|---|---|---|
| 4,846,699 A | * | 7/1989 | Glover et al. | 439/64 |
| 4,869,676 A | * | 9/1989 | Demler, Jr. et al. | 439/79 |
| 4,917,616 A | * | 4/1990 | Demler, Jr. et al. | 439/101 |
| 5,024,609 A | * | 6/1991 | Piorunneck | 439/637 |
| 5,086,372 A | * | 2/1992 | Bennett et al. | 361/802 |
| 5,157,326 A | * | 10/1992 | Burnsides | 324/537 |
| 5,338,214 A | | 8/1994 | Steffes et al. | |
| 5,406,453 A | | 4/1995 | Cusato et al. | |
| 5,450,365 A | * | 9/1995 | Adachi | 365/226 |
| 5,469,399 A | * | 11/1995 | Sato et al. | 365/226 |
| 5,519,573 A | | 5/1996 | Cobb et al. | |
| 5,596,263 A | * | 1/1997 | Zavis et al. | 323/255 |
| 5,604,871 A | | 2/1997 | Pecone | |
| 5,734,840 A | | 3/1998 | Chew et al. | |
| 5,755,145 A | * | 5/1998 | Iwata et al. | 74/604 |
| 5,828,892 A | * | 10/1998 | Mizuta | 713/300 |
| 5,831,890 A | * | 11/1998 | Selna et al. | 365/51 |
| 5,864,478 A | * | 1/1999 | McCutchan et al. | 363/147 |
| 5,935,227 A | * | 8/1999 | Phan | 710/101 |
| 5,944,541 A | * | 8/1999 | Payne | 439/108 |
| 6,040,691 A | * | 3/2000 | Hanners et al. | 324/158.1 |

* cited by examiner

Primary Examiner—Sumati Lefkowitz
(74) Attorney, Agent, or Firm—Haynes and Boone, LLP

(57) ABSTRACT

In a computer system, an apparatus including a power supply system having a voltage regulator and a power supply for supplying an unregulated voltage to the voltage regulator. A memory connector is mounted on the motherboard. The memory connectors is configured to receive a memory module. A memory controller is mounted on the motherboard. A riser card having an edge portion configured to be received by the memory module is removably inserted into the memory connector. A riser card interface is coupled from the riser card to the power supply system and memory switch for enabling an interface-dependent voltage to be established by the voltage regulator and supplied to the memory controller. The interface-dependent voltage is supplied to the riser card through the memory connector and is maintained at a level whereby the memory connector is subjected to an electrical current less than a maximum prescribed current. A voltage modifying device is mounted on the riser card. The voltage modifying device is coupled to the interface-dependent voltage and is coupled to supply a modified voltage to the memory module. A voltage switch is coupled to the voltage modifying device and to the memory controller for enabling the modified voltage to be supplied through the voltage switch to the memory controller.

40 Claims, 6 Drawing Sheets

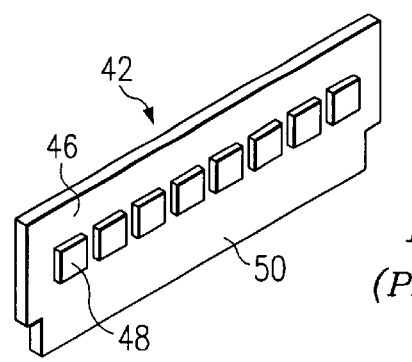
*Fig. 5*
(PRIOR ART)
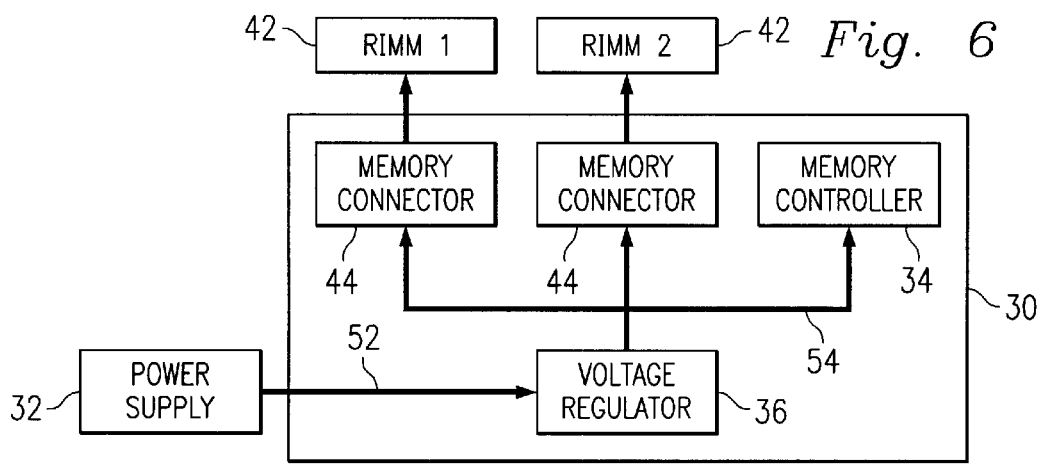
*Fig. 6*
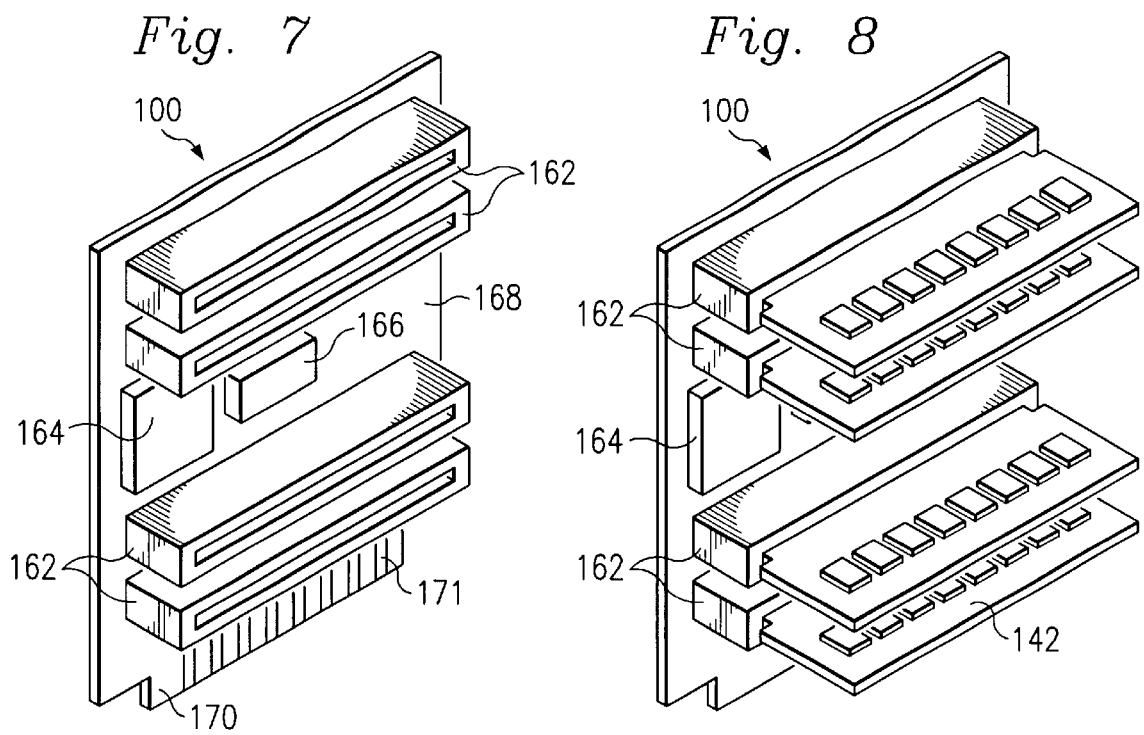
*Fig. 7*
*Fig. 8*

MEMORY RISER CARD FOR A COMPUTER SYSTEM

BACKGROUND

The disclosures herein relate generally to computer systems, and more particularly to riser cards for memory and the like in a computer system.

With current memory technology from RAMBUS Incorporated, there are two separate system memory architectures used in workstation system designs. Both of these architectures utilize RAMBUS memory technology called RAMBUS In-line Memory Modules (hereafter referred to as RIMMs). One architecture is a "low-memory" scheme and the other is a "high-memory scheme". The low-memory scheme is typically of a lower cost than is the high-memory scheme. Due to the specific nature of each scheme, the components used in the two schemes are not readily interchangeable.

The high-memory scheme is broken into several configurations whereby the high-memory scheme is scaleable. However, the low-memory scheme is not readily scaleable. The scaleability of the high-memory scheme allows each of its configurations to be cost optimized for the amount of memory that it supports. The scaleability of the high-memory scheme assists in addressing cost issues associated with the high-memory scheme.

The low-memory scheme supports 32 RAMBUS devices per channel for a total of 512 MegaBytes per channel. The RAMBUS memory devices are provided on a RIMM. The RIMM is then plugged into a RIMM connector. If more system memory is required, a different memory scheme must be used.

For high-memory schemes, one or more Memory Repeater Hubs (hereafter referred to a MRHs) are mounted on a riser card that is plugged into a riser card connector on the motherboard. Each MRH provides two RAMBUS channels for data processing. Based on current 64 MegaByte memory devices, each channel can support RIMMs totaling 512 MegaBytes per channel. A riser card that supports 1 GigaByte of memory requires only one MRH. A riser card that supports 2 GigaBytes of memory requires two MRHs. MRH's and detailed information on the operation and applications for MRHs are readily available from Intel Corporation. As higher density devices (i.e. 128 MegaByte) become available, the total amount of memory that each channel can support will increase accordingly.

The riser card is plugged into a riser card connector on the motherboard. The riser card connector provides a RAMBUS channel as well as power to the riser card. Presently, a riser card connector that also meets the impedance requirements of RIMMs does not exist.

Impedance mismatch is a key factor in riser connectors not being compatible with RIMMs in high speed applications. RAMBUS memory technology is based on circuitry with a characteristic impedance of 28 ohms with a tolerance of +/-10%. As a result, RIMM connectors are designed to provide a characteristic impedance of 28 ohms so that it meets the requirements of RAMBUS memory technology. A typical riser connector has a characteristic impedance of 72 ohms. Employing a riser connector in a circuit having a characteristic impedance of 28 ohms would result in an impedance discontinuity. Anytime a signal is propagated down a transmission line having an impedance discontinuity, a reflection is generated. Reflections are not desirable as they induce noise into the signal. In the case of a RIMM operating at high speeds, reflections should be avoided at any cost.

Another issue that will need to be resolved for the scaleability of system memory is power consumption of memory devices on a riser card. The power requirements of an 8 RIMM riser card can be as much as 40 watts as each RIMM requires approximately 5 watts. A standard 184 pin RIMM connector can provide a maximum of 13 amps distributed across 26 power pins. As RIMMs are designed to be operated at 2.5 volts DC (VDC), an 8 RIMM riser card would require as much as 16 amps. This would exceed the recommended maximum amperage rating for a RIMM connector and compromise the reliability of the riser-to-connector power connections.

U.S. Pat. No. 5,604,871 to Pecone discloses a personal computer system utilizing a simplified motherboard having connectors on the motherboard and a riser card or cards having the desired interface connectors and logic circuits thereon. The present invention provides for operatively and removably coupling a plurality of I/O expansion cards, host local bus interfaces and future system upgrades for the computer system without burdening the base cost thereof. The computer system may be expanded or upgraded at any time during manufacture or in the field. A riser card is configured for the desired features, plugged into the motherboard connectors, and a desired new peripheral feature is plugged into the riser card to complete the upgrade.

U.S. Pat. No. 5,604,871 to Cusato et al discloses a computer file server with a specially designed planar/riser card assembly is mounted on the computer chassis and includes a card cage structure in which a riser card is secured. Carried on the riser card are I/O card edge connectors into which all of the system I/O cards may be plugged. The riser card is hard connected into the system and has an edge connector portion. The system planar board is carried on a mounting plate which is screwed to an outer side of the cage structure. A connector carried on the planar board receives the edge connector portion of the riser card, thereby electrically coupling the planar board to the riser card. The riser card serves as a wiring plane containing only the signals which the planar board would normally provide to the I/O cards through "on planar" connectors.

U.S. Pat. No. 5,524,232 to Hajeer discloses a computer memory module adaptor configured for adapting a computer memory module connector to receive a plurality of memory modules. The memory module adaptor includes a board with connecting pins for electrically connecting the adaptor to the computer memory module receiving connector, a plurality of support members mounted on the memory module adaptor for receiving 8-bit memory modules, and a circuit for adapting the 8-bit memory modules for use as a single higher-order parallel bit memory module.

While these references disclose memory module connectors and riser cards for interconnecting items such as memory cards, they do not address the impedance or power issues associated with using RIMM modules on a riser card in high speed applications. The references disclose riser cards employ conventional connector usage that is limited for effectively and economically addressing scaleability issues for both low memory and high memory schemes, addressing power requirements of the riser card that would result in the connector being subjected to current in excess of the maximum recommended current, addressing scaleability issues for RIMM low-memory and high-memory schemes, or power management issues associated with current requirements in excess of the maximum recommended current for a connector.

Accordingly, a need has arisen for an apparatus that is configured to overcome the shortcomings of prior art riser card techniques and constructions. In particular, there is a need for a cost-effective yet reliable apparatus for providing a riser card that addresses the scaleability needs for both RIMM low-memory and high-memory schemes. This apparatus will employ a connector that is compatible with a RIMM and a riser card. The apparatus will be capable of managing the power requirements of the riser card without drawing a current through the connector that would exceed the maximum recommended current for the connector. The connector will also be compatible with RAMBUS circuitry from an impedance standpoint. The characteristic impedance of the connector used with a riser card according to the present invention will substantially match that of a RIMM.

SUMMARY

One embodiment, accordingly, provides a riser card that offers a cost-effective and reliable technique for addressing the scaleability needs for both RIMM low-memory and high-memory schemes. The riser card may be plugged into a connector that is compatible with RIMM modules as well as riser cards designed for RIMM connectors. The riser card is configured such that the amount of current drawn through the connector for operating the riser card is maintained at or below the maximum rated amperage of the connector. To this end, a computer system having a power supply system and a motherboard includes a memory connector mounted on the motherboard. The memory connector is configured to receive a memory module. A riser card having an edge portion is configured to be received by the memory module connector. The riser card is removably inserted into the memory connector. A riser card interface is coupled from the riser card connector to the power supply system for enabling an interface-dependent voltage to be established by the power supply system. The interface-dependent voltage is supplied to the riser card through the memory connector and is maintained at a level whereby the memory connector is subjected to an electrical current less than a maximum prescribed current.

A principal advantage of this embodiment is that the riser card allows the low-memory scheme and high-memory scheme to be interchangeable in any given computer system. In the low-memory scheme, RIMM's can be plugged directly into a RIMM compatible connector. In the high-memory scheme, a riser card carrying an MRH is plugged into the RIMM connector such that additional memory can be provided. As the riser card carries a voltage regulator, the current drawn through the connector for operating the memory may be managed such that it does not exceed that maximum rated current of the connector.

BRIEF DESCRIPTION OF THE DRAWING FIGURES

FIG. 5 is a perspective view showing an illustrative embodiment of a memory module.

FIG. 6 is a block diagram showing an illustrative embodiment of a power routing schematic for a low-memory scheme.

FIG. 7 is a perspective view showing an illustrative embodiment of a riser card according to the present invention.

FIG. 8 is a perspective view showing an illustrative embodiment of the riser shown in FIG. 7 populated with memory modules.

DETAILED DESCRIPTION

Figure 1:
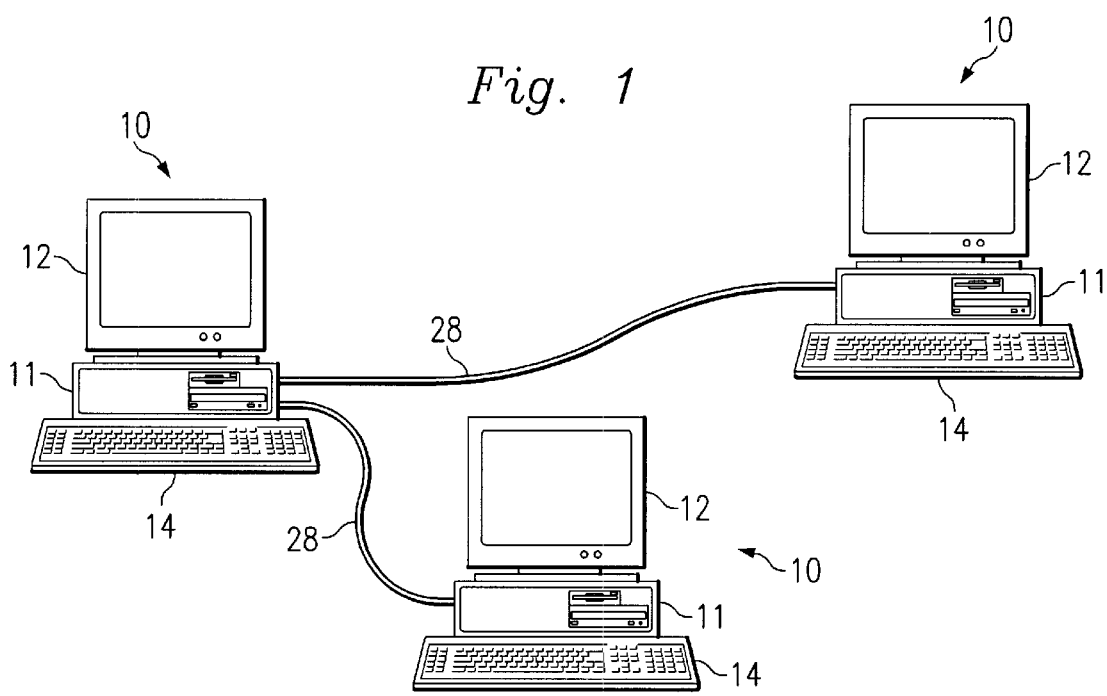
FIG. 1 is a diagrammatic view showing an illustrative embodiment of a computer network.

FIG. 1 shows an illustrative embodiment of a networked computer system including three computer systems 10. The networked computer system may include one or more of the following types of computer systems: personal-type computer systems, host-type computer systems such as workstations or servers, other known types of computer systems or a combination thereof. In a networked computer system as well as in standalone computer systems, one or more of the computer systems may be loaded with software applications requiring large amounts of Random Access Memory (hereinafter referred to as RAM). Software applications used for 3D modeling, finite element analysis, and the like are known to be memory intensive applications. In many instances, various types of computer systems will require additional RAM to accommodate these types of memory intensive applications and upgrades to new versions of existing software such as operating systems. For this reason, it is desirable that these computer systems be designed such that the RAM is scaleable.

Figure 2:
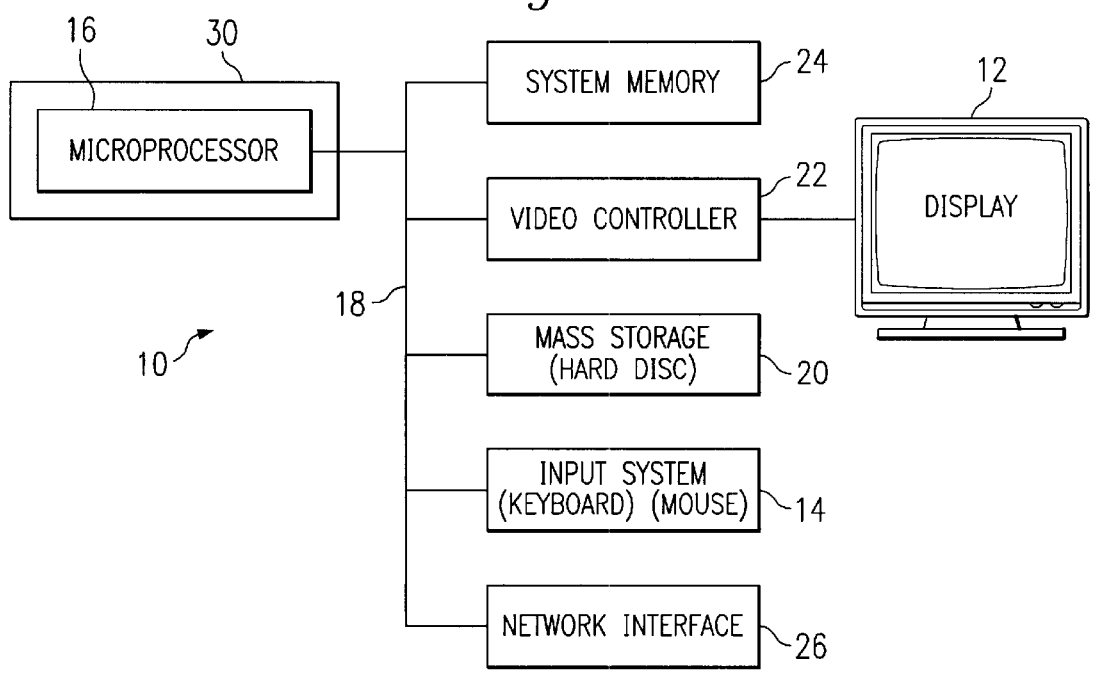
FIG. 2 is an illustrative embodiment of a block diagram of a computer system.

As shown in FIGS. 1 and 2, each computer system 10 is shown to have an enclosure 11 housing various system devices, a display 12 and an input system 14. Each computer system 10 will typically include a microprocessor 16 mounted on a mother board 30 which is connected to a bus 18. The bus 18 serves as a connection between the microprocessor 16 and other components of the computer system 10. The input system 14 is coupled to the microprocessor 16 to provide input to the microprocessor 16. Examples of input devices include keyboards, touchscreens, and pointing devices such as a mice, trackballs, and trackpads. Programs and data are stored on a mass storage device 20 which is coupled to the microprocessor 16. Mass storage devices include such devices as hard disks, optical disks, magneto-optical drives, floppy drives, and the like. The display 12 is typically coupled to the microprocessor 16 by a video controller 22.

The system memory 24 provides the microprocessor 16 with fast storage to facilitate execution of computer programs by the microprocessor 16. In most instances, the system memory 24 will be of the RAM type. A network interface 26 is typically provided such that the various the various computer systems in the computer network can communicate with each other via one or more network cables 28. It should be understood that other busses and intermediate circuits can be employed between the components described above and microprocessor 16 to facilitate interconnection between the components and the microprocessor.

Figure 3:
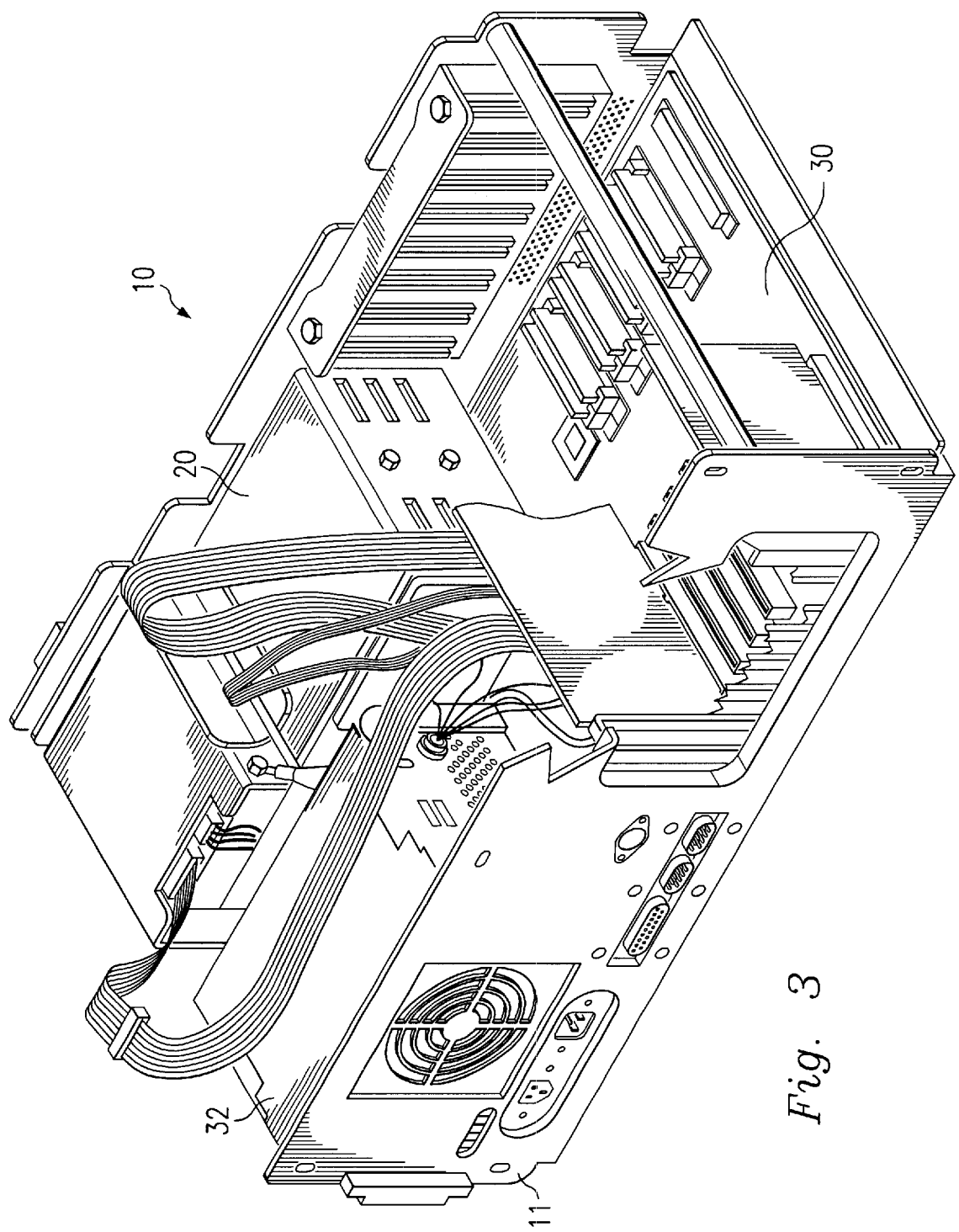
FIG. 3 is a perspective view showing an illustrative embodiment of various internal components of a computer system.
Figure 4:
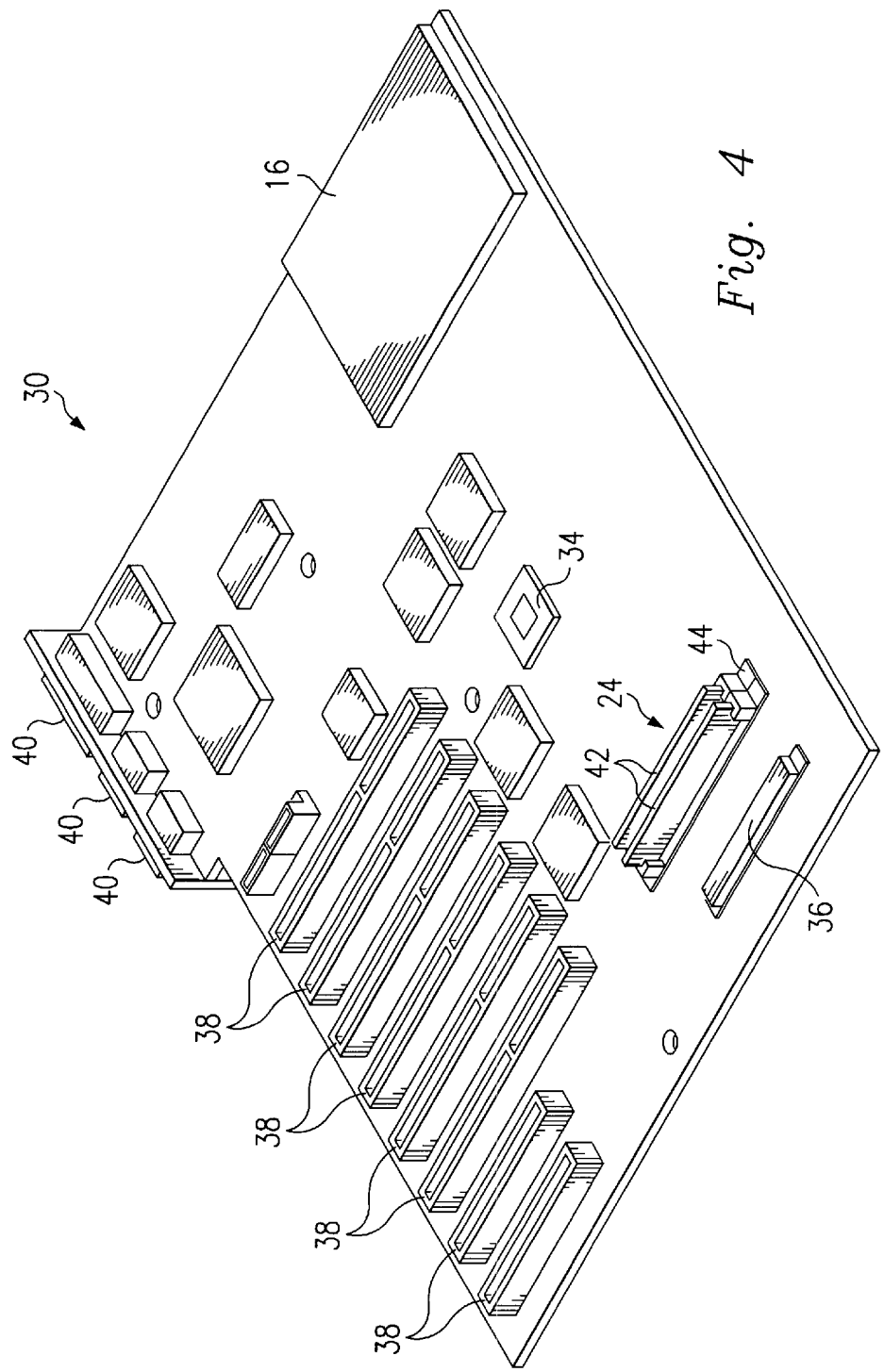
FIG. 4 is a perspective view showing an illustrative embodiment of a motherboard.
Figure 9:
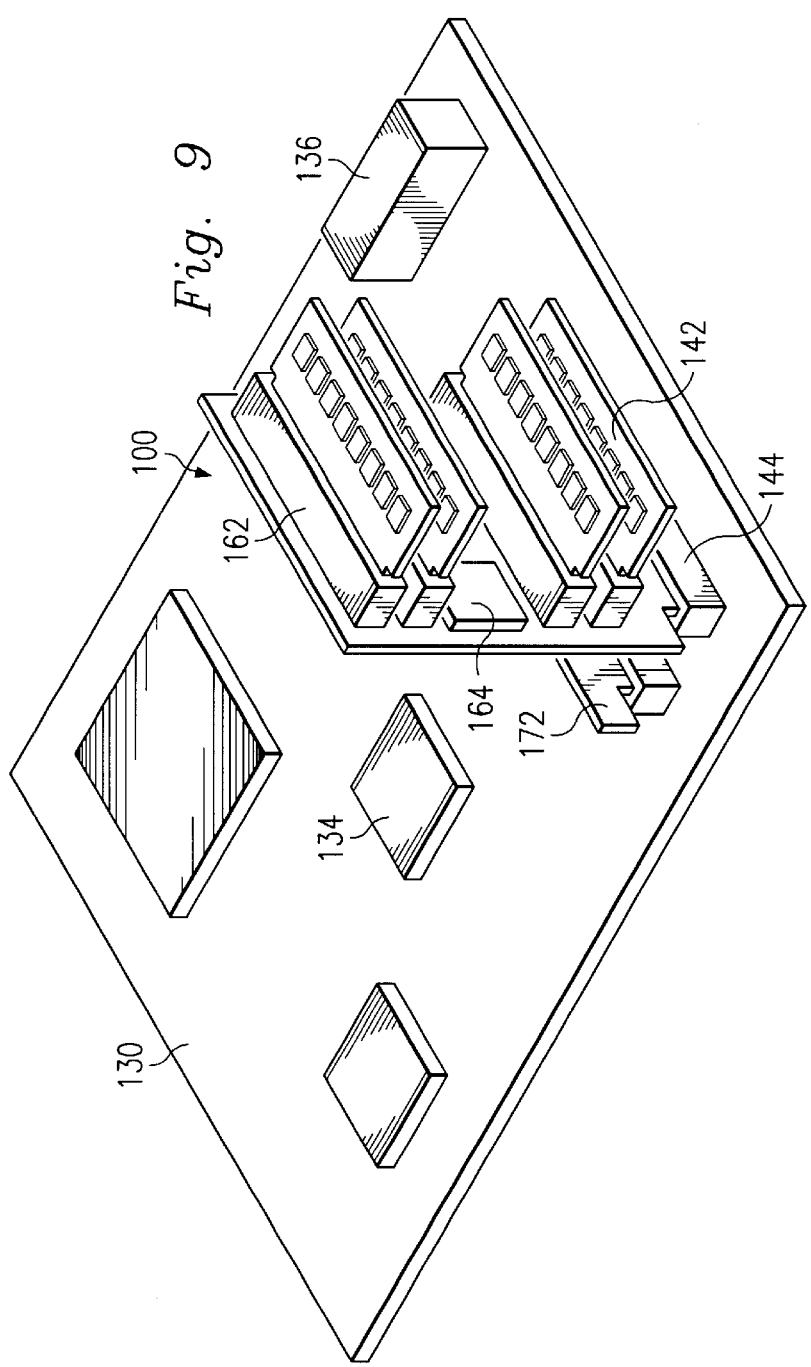
FIG. 9 is a perspective view showing an illustrative embodiment of a motherboard having the riser card of FIG. 8 mounted on it.
Figure 10:
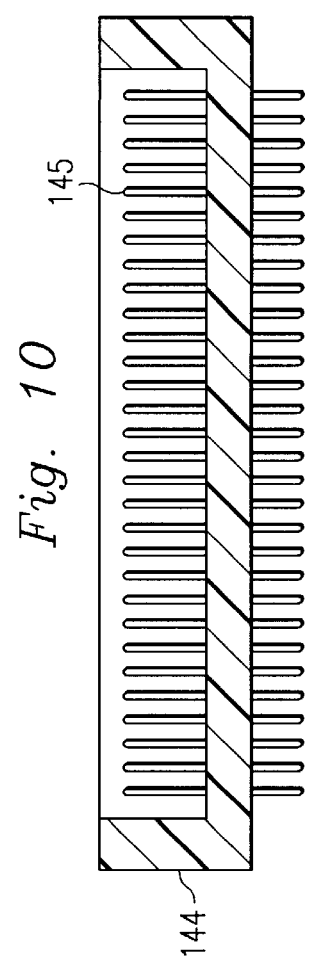
FIG. 10 is a cross sectional view showing an illustrative embodiment of a memory connector.

As shown in FIGS. 3 and 4, each computer system 10 will typically have various system devices such as a motherboard 30, a power supply 32 and the mass storage device 20 housed in the enclosure 11. The motherboard 30 will typically have a variety of system devices mounted on it, such as the microprocessor 16, system memory 24, a memory controller 34, a voltage regulator 36, and a plurality of bus connectors 38 and input-output connectors 40 for interconnecting to various peripheral and related system devices (not shown). The system memory 24 will often include a plurality of memory modules 42 removably inserted into memory connectors 44 that are mounted on the motherboard 30. The term "power supply system" is hereinafter meant to include the power supply 32 and the voltage regulator 36.

It will be appreciated that various types of memory technologies require specific types of memory connectors. For example, RIMMs are based on RAMBUS memory technology and require RIMM-compatible connectors. As discussed in the background section, RAMBUS memory technology is based on a characteristic impedance of 28 ohms. As a result, the various components in the memory bus such as the memory connectors must be designed to be meet this impedance specification.

The memory controller 34 controls the flow of data to and from the system memory 24. As the memory modules 42 are typically designed to be operated within a specific voltage range, a voltage regulator 36 is commonly coupled between the power supply 32 and the system memory 24 to regulate the voltage provided from the power supply 32 to the system memory 24. For example, RAM such as RIMMs designed with RAMBUS-based memory technology are designed to operate at 2.5 VDC.

FIG. 5 shows an illustrative embodiment of a typical memory module 42. The memory module 42 will generally consist of a printed circuit substrate 46 with a plurality of memory devices 48 mounted it. The memory module 42 has an edge portion 50 that is removably insertable into a memory connector 44 (shown in FIG. 4). A plurality of conductive traces (not shown) on the printed circuit substrate electrically connect the memory devices 48 to the motherboard 30 through the memory connector 44. The printed circuit substrate 46 may be a printed circuit board, flexible circuit or other type of construction known in the art.

Referring to FIG. 6, the power routing for a computer system with RAMBUS memory technology is described. An unregulated voltage 52 is supplied from the power supply 32 to the voltage regulator 36. By unregulated, it is meant that the voltage supplied by the power supply is unregulated relative to the voltage requirements of the various system components such as the memory modules and memory controller. The voltage provided by a power supply may be regulated to a specific but non-desirable voltage.

The voltage regulator 36 provides a regulated voltage 54 that is routed to the memory modules 42 and memory controller 34. By regulated voltage, it is meant that the voltage supplied by the voltage regulator is regulated relative to the voltage requirements of the various system components such as the memory modules and memory controller. As shown, power is routed through the memory connectors 44 to the memory modules 42. Depending on the specific configuration of the system memory, one of the memory modules 42 may be replaced with a continuity module that routes the data through the connector but does not provide any processing functionality.

For RAMBUS technology, the memory modules are RIMMs that operate on a regulated voltage 54 of 2.5 VDC. Typically, each RIMM draws 2 amps and a memory controller operating at 2.5 volts draws 1 amp. To avoid damage to the memory connectors 44, the current routed through the connector must not exceed the maximum amperage capacity of the connector. For a standard 184 pin RIMM connector, the maximum amperage capacity is approximately 1 amp for each pin. To ensure long-term reliability, it is common in the computer industry to route no more than 500 milliamps through each pin.

Now turning to the illustrative embodiments according to the present invention, the power consumption and impedance issues may be effectively and economically addressed by a riser card according to the illustrative embodiment shown in FIGS. 8–12. For simplicity, a 4 RIMM riser card is shown in the applicable drawings.

To illustrate an example of the power requirements of a typical riser card, consider a riser card populated with 8 RIMMs. The power requirements of an 8 RIMM riser card can be as much as 40 watts as each RIMM typically requires approximately 5 watts. A standard 184-pin RIMM connector can provide a maximum of 13 amps distributed across 26 power pins. As RIMMs are designed to be operated at 2.5 volts DC (VDC), an 8 RIMM riser card would require as much as 16 amps. This would exceed the recommended maximum amperage rating for a RIMM connector and compromise the reliability of the riser-to-connector power connections. A standard 168-pin RIMM connector would exhibit even more dramatic reliability issues as only 10 power pins are provided in a 168-pin RIMM connector.

As shown best in FIGS. 7–10, the illustrative embodiment shown includes a riser card 100 having a plurality of memory module connectors 162, an MRH 164 and a voltage modifying device 166 mounted on a riser card printed circuit substrate 168. The riser card 168 has an edge portion 170 such is removably insertable into a memory connector 144 on a motherboard 130. A plurality of conductive contacts 171 mates with respective power pins 145 in the memory connector 144 (see FIG. 10).

Because RAMBUS technology is based on a daisy-chain type of architecture, any remaining memory connector 144 not populate with a RIMM or a riser card must have a continuity module 172 installed in it to maintain continuity of the memory bus. The printed circuit substrate 168 of the riser card may be a printed circuit board, flexible circuit or other type of construction known in the art. For high speed applications, the riser card 100 will be constructed to have a characteristic impedance of 28 ohms.

A key aspect of the present invention is that each memory connector 144 is constructed to be RIMM compatible. Until now, memory connectors for risers have not been RIMM compatible. The new and unanticipated benefits of the present invention are at least partially a result of the use of a memory connector capable of receiving a RIMM and a riser. That is, a riser card may be removably inserted into the memory connector or a RIMM may be removably inserted into the memory connector.

Figure 11:
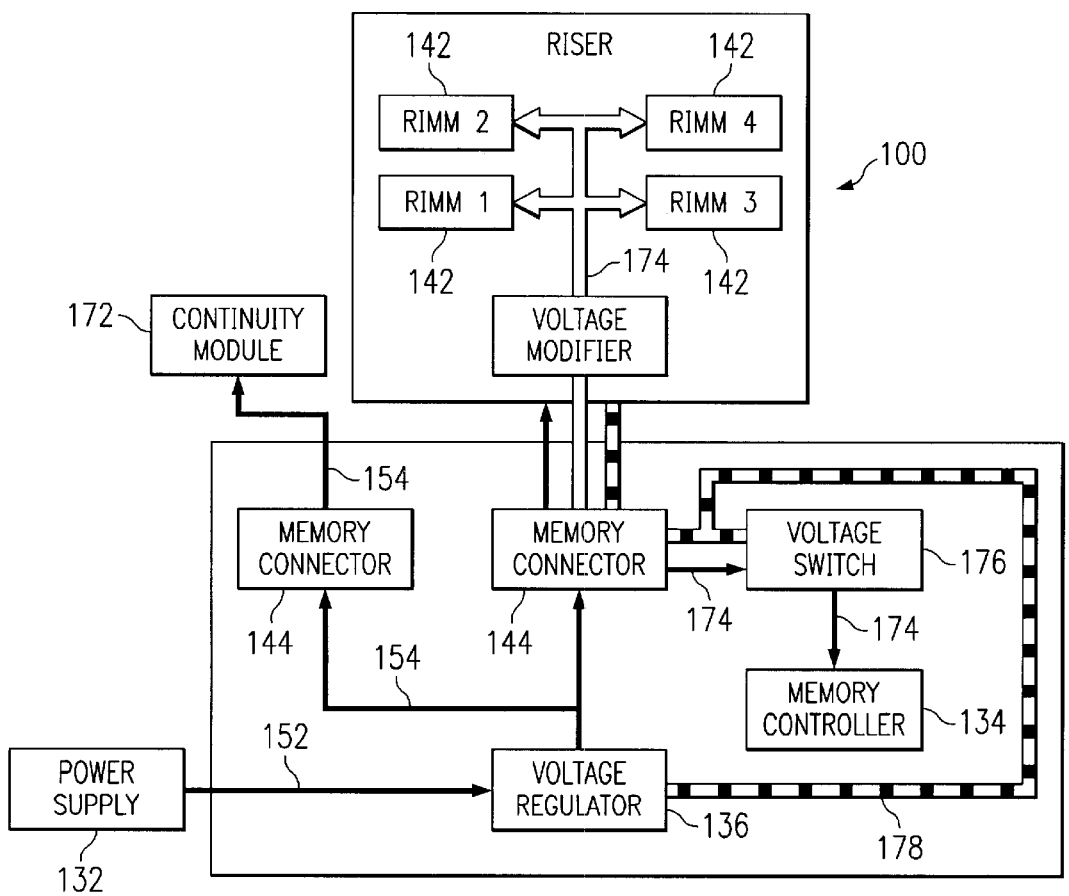
FIG. 11 is a block diagram showing an illustrative embodiment of a power routing schematic for a high memory scheme of an apparatus according to the present invention.

FIG. 11 shows an illustrative embodiment of a power routing schematic in an apparatus according to the present invention. When a riser card 100 is connected to a memory connector 144, a riser card interface 178 is established between the riser card 100, the voltage switch 176 and the voltage regulator 136. The riser card interface 178 accomplishes two key tasks. First, the riser card interface 178 is used by the voltage regulator 136 to determine the appropriate interface-dependent voltage to supply. When the riser card interface 178 is established, the interface-dependent voltage 154 is modified to a level sufficient to reduce the amount of electrical current passed through the memory connector 144 that the riser card 100 is plugged into. Second, the riser card interface 178 communicates with the voltage switch 176 such that the modified voltage 174 is provided to the memory controller 134. In a preferred embodiment, one of the pins of the memory connector 144 may be used to establish the riser card interface 178 between the riser card 100 and the voltage switch 176.

The underlying principal of the voltage routing and related circuitry shown is that the current across the memory connector 144 is reduced by increasing the voltage supplied to the riser card 100. When a riser card 100 is plugged into a memory connector 144, the current draw across the memory connector 144 to the riser card 100 is reduced to a suitable level by increasing the interface-dependent voltage 154 provided to the riser card 100.

The interface-dependent voltage 154 is supplied from the power supply system, i.e. by power supply 132 via the voltage regulator 136 on the motherboard 130. By reducing the current through the memory connector 144, damage to the power pins of the memory connector 144 is precluded. In a preferred embodiment, the power supply 132 is the power supply of a computer system.

As an example, for a riser card requiring 40 watts, providing 12 VDC to the riser card from the motherboard will result in a total of 3.3 amps to the riser card.

For the typical recommended level of approximately 500 mA per power pin, only 16 of the 26 power pins in a standard 184-pin RIMM connector are needed to provide the required current. This is well below the maximum recommended amperage of 13 amps for a 184-pin RIMM connector.

However, in most instances, the voltage required by the memory modules 142 and by the memory controller 134 will be significantly less than the interface-dependent voltage 154 supplied to the riser card 100. To provide a voltage of a desired level to the memory modules 142 and to the memory controller 134, a voltage modifying device 166 is used to convert the interface-dependent voltage 154 provided to the riser card 100 to a modified voltage 174. The modified voltage 174 is supplied directly to the memory modules 142 and to the memory controller 134 through a voltage switching device 176 such as voltage switch. For applications in which RIMM modules are used, the modified voltage 174 will be approximately 2.5 VDC.

The voltage modifying device 166 has the functional operation of converting an interface-dependent voltage 154 at a first level to a modified voltage 174 at a second level. According to the present invention, the interface-dependent voltage 154 will be at a higher voltage than the modified voltage 174. It should be understood that the specific design and construction techniques of the voltage modifying devices such as voltage modifying device 166 are well known in the art and that these designs and construction techniques may vary widely. In some instances, the voltage modifying device may be a unitary electronic device mounted on the riser 100. In other cases, it may comprise a plurality of discrete board-mountable components mounted on the riser 100.

The voltage switch 176 has the functional operation of directing either the modified voltage 174 or the interface-dependent voltage 154 to the memory controller. It should be understood that the specific design and construction techniques of devices that may serve as the voltage switch 176 in the present invention are well known in the art and that these designs and construction techniques may vary widely. In some instances, the voltage switching device may be a unitary electronic device or a plurality of discrete board-mountable components mounted on the motherboard 130 or on the riser 100.

When a riser card 100 is connected to a memory connector 144, a riser card interface 178 is established between the riser card 100 and the voltage switch 176. The voltage switch 176 correspondingly communicates with the voltage regulator 136. The riser card interface 178 accomplishes two key tasks. First, the riser card interface 178 is used by the voltage regulator 136 to determine the appropriate interface-dependent voltage to supply. When the riser card interface 178 is established, the interface-dependent voltage 154 is increased to a level sufficient to reduce the amount of current passed through the memory connector 144 that the riser card 100 is plugged into. Second, the riser card interface 178 communicates with the voltage switch 176 such that the modified voltage 174 is provided to the memory controller 134. In a preferred embodiment, one of the pins of the memory connector 144 may be used to establish the riser card interface 178 between the riser card 100 and the voltage switch 176.

Figure 12:
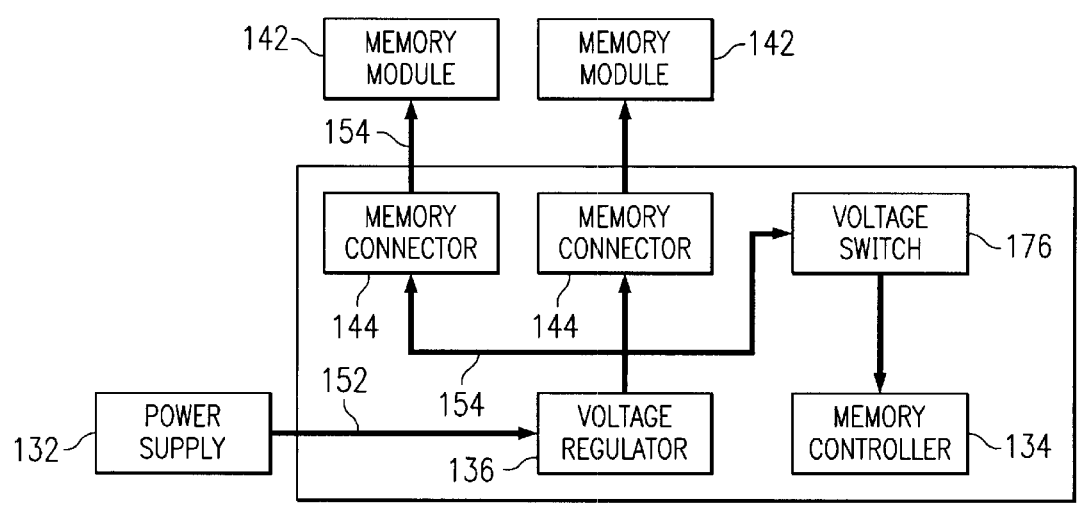
FIG. 12 is a block diagram showing an illustrative embodiment of a power routing schematic for a low memory scheme of an apparatus according to the present invention.

Referring now to FIG. 12, when memory modules 142 are installed in the memory connectors 144 rather than a riser card and continuity module, no riser card interface 178 or modified voltage is provided to the voltage switch 176. In this application, the lack of a riser card interface 178 causes the voltage regulator 136 to provide a suitable voltage for the memory modules 142 and memory controller 134 and causes the voltage switch 176 to provide the interface-dependent voltage 154 to the memory controller 134. In the case of RIMMs, this will typically be 2.5 VDC.

In operation, the embodiments disclosed herein provide an apparatus including at least one memory repeater hub and a voltage modifying device mounted on a riser card. The riser card is removably inserted into a RIMM compatible memory connector that is mounted on the motherboard of a computer. A riser card interface coupled to the power supply system and to the voltage switch is established when the riser card is plugged into the memory connector. A power supply system provides a interface-dependent voltage to the riser. The interface-dependent voltage is maintained at level sufficiently high whereby the power requirements of the riser card can be met without the current capacity of the memory connector being exceeded. The riser card-mounted voltage modifying device serves to reduce the interface-dependent voltage supplied to the riser card to a modified voltage that meets the requirements of the riser card-mounted memory modules. The modified voltage is also provided through the memory connector and through the voltage switch to the motherboard-mounted memory controller.

As a result, in a computer system having a power supply system and a motherboard, one embodiment according to the present inventions that includes an apparatus having a memory connector mounted on the motherboard. The memory connector is configured to receive a memory module. A riser card having an edge portion is configured to be received by the memory module. The riser card is removably inserted into the memory connector. A riser card interface is coupled from the riser card to the power supply system for enabling an interface-dependent voltage to be established by the power supply system. The interface-dependent voltage is supplied to the riser card through the memory connector and is maintained at a level whereby the memory connector is subjected to an electrical current less than a maximum prescribed current.

In another embodiment, a computer system includes a power supply system, a motherboard, a microprocessor mounted on the motherboard, a bus coupled to the microprocessor, an input device coupled to the bus and a system memory coupled to provide storage to facilitate execution of computer programs by the microprocessor. A memory connector is mounted on the motherboard. The memory connector is configured to receive a memory module. A riser card having an edge portion configured to be received by the memory module is removably inserted into the memory connector. A riser card interface is coupled from the riser card to the power supply system for enabling an interface-dependent voltage to be established by the power supply system. The interface-dependent voltage is supplied to the riser card through the at least one memory connector and is maintained at a level whereby the memory connector is subjected to an electrical current less than a maximum prescribed current.

In yet another embodiment, an apparatus in a computer system includes a power supply system having a voltage regulator and a power supply for supplying an unregulated voltage to the voltage regulator. A memory connector is mounted on the motherboard. The memory connector is configured to receive a memory module. A memory controller is mounted on the motherboard. A riser card having an edge portion configured to be received by the memory module is removably inserted into the memory connector. A riser card interface is coupled from the riser card to the power supply system for enabling an interface-dependent voltage to be established by the voltage regulator. The interface-dependent voltage is supplied to the riser card through the memory connector and is maintained at a level whereby the memory connector is subjected to an electrical current less than a maximum prescribed current. A voltage modifying device is mounted on the riser card. The voltage modifying device is coupled to the interface-dependent voltage and is coupled to supply a modified voltage to the memory module of the memory module connector. A voltage switch is coupled to the voltage modifying device and to the memory controller for enabling the modified voltage to be supplied through the voltage switch to the memory controller.

In still a further embodiment, a method for expanding the memory capacity of a computer system includes the following steps. Providing a computer system having a power supply system and a motherboard with at least one memory connector mounted thereon, the memory connector being configured to receive a memory module. Mounting a riser card having an edge portion configured to be received by the memory module in the at least one memory connector. Establishing a riser card interface, the riser card interface being coupled from the riser card to the power supply system for enabling an interface-dependent voltage to be established by the power supply system. In addition, the interface-dependent voltage is supplied to the riser card through the memory connector and is maintained at a level whereby the memory connector is subjected to an electrical current less than a maximum prescribed current.

As it can be seen, a principal advantage of the illustrative embodiments presented herein is that the riser card allows the low-memory scheme and high-memory scheme to be interchangeable in any given computer system. In the low-memory scheme, RIMM's can be plugged directly into a RIMM compatible memory connector that is mounted on the motherboard. In the high-memory scheme, a riser card carrying one or more MRHs is plugged into the memory connector such that additional system memory can be provided. The riser card carries a voltage modifying device such that the current that passes through the connector for operating the memory modules may be provided at a suitable level. In the case of an 8 RIMM riser, the voltage provided to the riser will typically be substantially higher that the required operating voltage of the RIMMs. By doing so, the current that passes through the memory connector can be maintained at a level that does not exceed its maximum rated current level.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. In a computer system having a power supply system and a motherboard, an apparatus comprising:
   a memory connector mounted on the motherboard, the memory connector being configured to receive a memory module;
   a riser card having an edge portion configured to be received by the memory connector, the riser card being removably inserted into the memory connector; and
   a riser card interface coupled between the riser card and the power supply system for enabling an interface-dependent voltage to be established by the power supply system, the interface-dependent voltage being supplied to the riser card through the memory connector and being maintained at a level whereby the memory connector is subjected to an electrical current less than a maximum prescribed current.

2. The apparatus of claim 1 wherein the connector has a plurality of power pins and wherein the maximum prescribed electrical current for each of the power pins is from about 500 mA to about 1 amp.

3. The apparatus of claim 1 wherein the memory module is a RAMBUS-type memory module.

4. The apparatus of claim 1 further comprising a voltage modifying device and a plurality of memory modules mounted on the riser card, the voltage modifying device being coupled to the interface-dependent voltage and being coupled to supply a modified voltage to the memory modules.

5. The apparatus of claim 4 wherein a memory controller is mounted on the motherboard and wherein the modified voltage is supplied to the memory controller.

6. The apparatus of claim 4 further comprising a voltage switch and a memory controller, the voltage switch being coupled to the voltage modifying device and to the memory controller for enabling the modified voltage to be supplied through the voltage switch to the memory controller.

7. The apparatus of claim 6 wherein the memory controller and the voltage switch are mounted on the motherboard.

8. The apparatus of claim 4 wherein the voltage modifying device is a voltage regulator.

9. The apparatus of claim 1 further comprising a plurality of memory module connectors mounted on the riser card, each of the memory module connectors being adapted to receive a RAMBUS-type memory module.

10. The apparatus of claim 1 further comprising a plurality of memory module connectors mounted on the riser card and further comprising a memory module mounted in at least a portion of the memory module connectors, the modified voltage being routed to the memory modules.

11. The apparatus of claim 10 wherein the memory modules are RAMBUS-type memory modules.

12. The apparatus of claim 1 wherein the power supply system includes a voltage regulator and a power supply for supplying an unregulated voltage to the voltage regulator, the interface-dependent voltage being established by the voltage regulator.

13. A computer system comprising:
a power supply system;
a motherboard;
a microprocessor mounted on the motherboard;
a bus coupled to the microprocessor;
an input device coupled to the bus; and
a system memory coupled to provide storage to facilitate execution of computer programs by the microprocessor;
a memory connector mounted on the motherboard, the memory connector being configured to receive a memory module;
a riser card having an edge portion configured to be received by the memory connector, the riser card being removably inserted into the memory connector; and
a riser card interface coupled between the riser card and the power supply system for enabling an interface-dependent voltage to be established by the power supply system, the interface-dependent voltage being supplied to the riser card through the memory connector and being maintained at a level whereby the memory connector is subjected to an electrical current less than a maximum prescribed current.

14. The computer system of claim 13 wherein the maximum prescribed electrical current for the memory connector is from about 500 mA to about 1 amp.

15. The computer system of claim 13 wherein the memory modules are RAMBUS-type memory modules.

16. The computer system of claim 13 further comprising a voltage modifying device and a plurality of memory modules mounted on the riser card, the voltage modifying device being coupled to receive the interface dependent voltage supplied from the power supply system and being coupled to supply a modified voltage to the memory modules.

17. The computer system of claim 16 wherein a memory controller is mounted on the motherboard and wherein the modified voltage is supplied to the memory controller.

18. The computer system of claim 17 further comprising a voltage switch, the voltage switch being coupled to the voltage modifying device and to the memory controller for enabling the modified voltage to be supplied through the voltage switch to the memory controller.

19. The computer system of claim 18 wherein the memory controller and the voltage switch are mounted on the motherboard.

20. The computer system of claim 16 wherein the voltage modifying device is a voltage regulator.

21. The computer system of claim 13 further comprising a plurality of memory module connectors mounted on the riser card, each of the memory module connectors being adapted to receive a RAMBUS-type memory module.

22. The computer system of claim 21 further comprising a plurality of memory module connectors mounted on the riser card and further comprising a memory module mounted in at least a portion of the memory module connectors, the modified voltage being routed to the memory modules.

23. The computer system of claim 22 wherein the memory modules are RAMBUS-type memory modules.

24. The computer system of claim 13 wherein the power supply system includes a voltage regulator and a power supply for supplying an unregulated voltage to the voltage regulator, the interface-dependent voltage being established by the voltage regulator.

25. An apparatus in a computer system, comprising:
a power supply system including a voltage regulator and a power supply for supplying an unregulated voltage to the voltage regulator,
at least one memory connector mounted on the motherboard, each of the at least one memory connectors being configured to receive a memory module;
a memory controller mounted on the motherboard;
a riser card having an edge portion configured to be received by the memory connector and having a plurality of memory module connectors mounted thereon, the riser card being removably inserted into the memory connector;
a riser card interface coupled between the riser card and the power supply system for enabling an interface-dependent voltage to be established by the voltage regulator, the interface-dependent voltage being supplied to the riser card modifying device through the at least one memory connector and being maintained at a level whereby the at least one memory connector is subjected to an electrical current less than a maximum prescribed current; and
a voltage modifying device mounted on the riser card, the voltage modifying device being coupled to the interface-dependent voltage and being coupled to supply a modified voltage to the memory module of each respective memory module connector; and
a voltage switch coupled to the voltage modifying device and to the memory controller for enabling the modified voltage to be supplied through the voltage switch to the memory controller.

26. A method for expanding the memory capacity of a computer system, said method comprising the steps of:
providing a computer system having a power supply system and a motherboard with a memory connector mounted thereon, the at least one memory connector being configured to receive a memory module,
mounting a riser card having an edge portion configured to be received by the memory module in the memory connector; and
establishing a riser card interface, the riser card interface being coupled between the riser card and the power supply system for enabling an interface-dependent voltage to be established by the power supply system, the interface-dependent voltage being supplied to the riser card through the memory connector and being maintained at a level whereby the memory connector is subjected to an electrical current less than a maximum prescribed current.

27. The method of claim 25 further comprising the step of mounting a voltage modifying device and a plurality of memory modules on the riser card, the voltage modifying device being coupled to receive an interface-dependent voltage supplied and being coupled to supply a modified voltage to each of the memory modules.

28. The method of claim 27 further comprising the step of mounting a memory controller and a voltage switch on the motherboard and the step of coupling the voltage switch to the voltage modifying device and to the memory controller for enabling the modified voltage to be supplied through the voltage switch to the memory controller.

29. The method of claim 26 further comprising the step of mounting a plurality of memory module connectors on the riser card, each of the memory module connectors being adapted to receive a RAMBUS-type memory module.

30. In a computer system having a power supply system and a motherboard, an apparatus comprising:

a connector mounted on the motherboard;

a memory riser card attached to the connector;

a voltage modifying device mounted on the memory riser card and electrically coupled to the power supply system, the voltage modifying device converting an input voltage supplied by the power supply system to a modified voltage, the modified voltage being less than the input voltage;

a plurality of memory modules mounted on the memory riser card and electrically coupled to the voltage modifying device for receiving the modified voltage; and a riser card interface coupled between the memory riser card and the power supply system wherein the input voltage is an interface-dependent voltage, the power supply system being electrically coupled to the memory riser card through the connector and maintaining the interface-dependent voltage at a level whereby a corresponding electrical current through the connector is maintained at a level less than a maximum prescribed electrical current.

31. The apparatus of claim 30 wherein the connector includes a plurality of power pins and wherein the maximum prescribed electrical current for each of the power pins is between about 500 mA and about 1 amp.

32. The apparatus of claim 30 wherein the memory modules are RAMBUS-type memory modules.

33. The apparatus of claim 30 wherein each of the memory modules, memory riser card and the connector have a characteristic data impedance of about 28 ohms.

34. The apparatus of claim 30, further comprising:

a memory controller mounted on the motherboard and electrically coupled to the memory modules, the voltage modifying device being electrically coupled to the memory controller for providing the modified voltage thereto.

35. The apparatus of claim 34, further comprising:

a voltage switch electrically coupled to the voltage modifying device and to the memory controller for directing the modified voltage to the memory controller when a riser card interface is coupled between the memory riser card and the power supply system.

36. The apparatus of claim 35 wherein the memory controller and the voltage switch are mounted on the motherboard.

37. The apparatus of claim 30 wherein the voltage modifying device includes a voltage regulator.

38. The apparatus of claim 30, further comprising:

a plurality of memory module connectors mounted on the memory riser card, at least a portion of the memory module connectors having one of the memory modules attached thereto.

39. The apparatus of claim 38 wherein the memory modules are RAMBUS-type memory modules and wherein each of the memory modules, memory riser card, the connector on the motherboard and the memory module connectors have a characteristic data impedance of about 28 ohms.

40. A memory riser card, comprising:

a printed circuit substrate including an edge portion configured for being connected to a memory module connector, the edge portion including a plurality of conductive contacts thereon;

a voltage modifying device mounted on the printed circuit substrate and electrically connected to one of the conductive contacts, the voltage modifying device configured for converting an input voltage to a modified voltage less than the input voltage;

a plurality of memory module connectors mounted on the printed circuit substrate and electrically connected to the voltage modifying devices; and a riser card interface coupled between the memory riser card and the power supply system wherein the input voltage is an interface-dependent voltage, the power supply system being electrically coupled to the memory riser card through the connector and maintaining the interface-dependent voltage at a level whereby a corresponding electrical current through the connector is maintained at a level less than a maximum prescribed electrical current.

* * * * *